Nov. 10, 1942.   L. A. DIXON   2,301,262
TIN GAS METER
Filed Feb. 12, 1938   2 Sheets-Sheet 1
Fig.1.
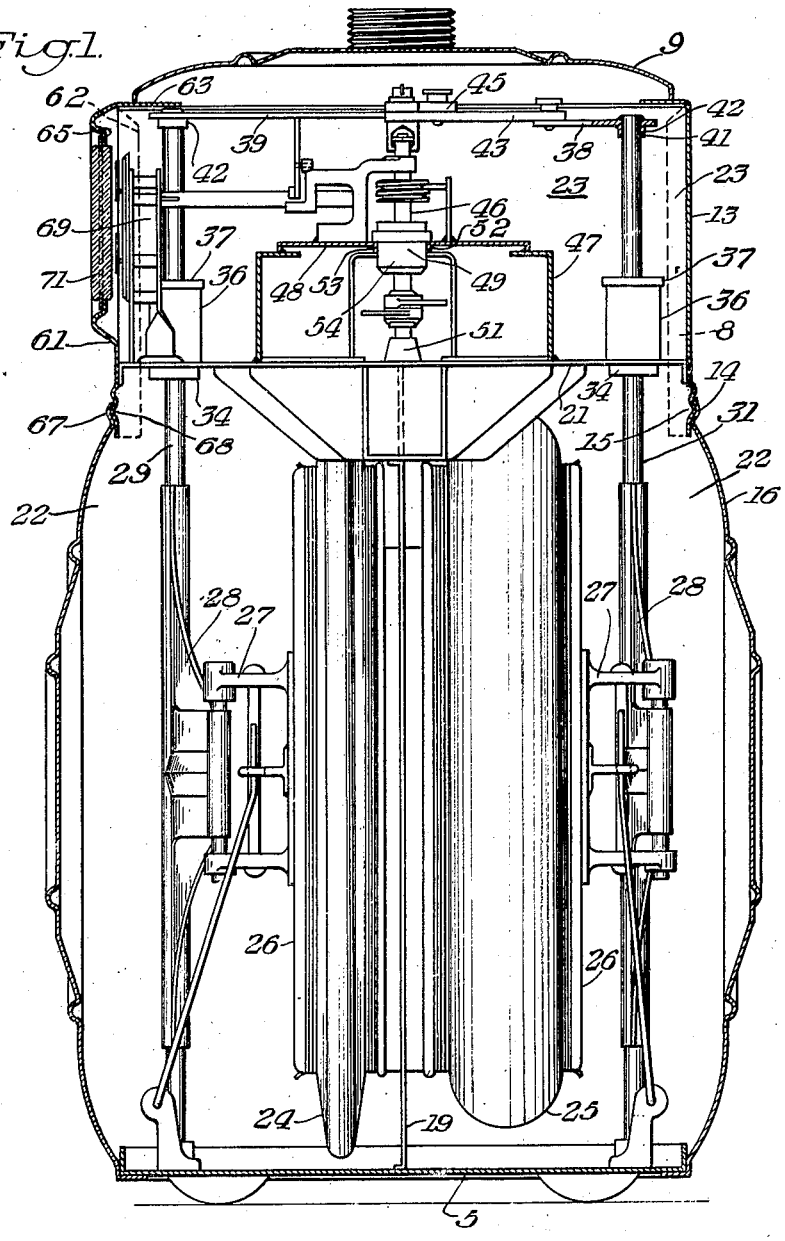
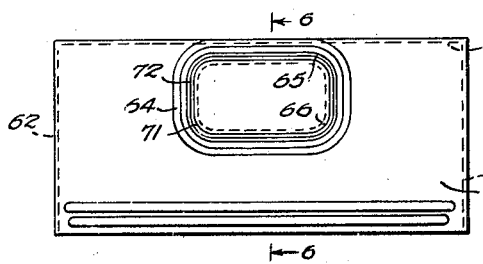
Fig.5
INVENTOR.
Lloyd A. Dixon.
BY Strauch & Hoffman
ATTORNEYS Nov. 10, 1942.  L. A. DIXON  2,301,262
TIN GAS METER
Filed Feb. 12, 1938  2 Sheets-Sheet 2
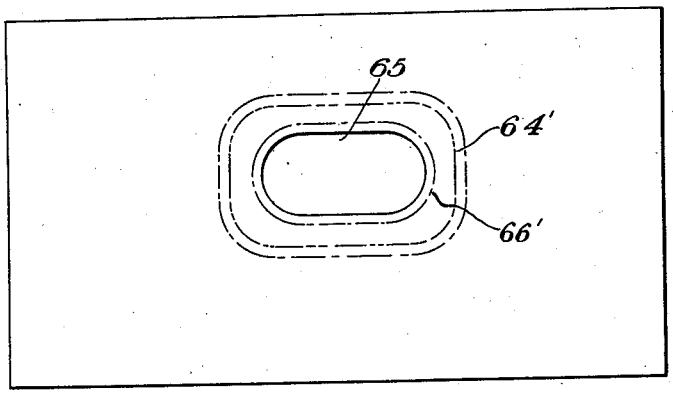
Fig. 2.
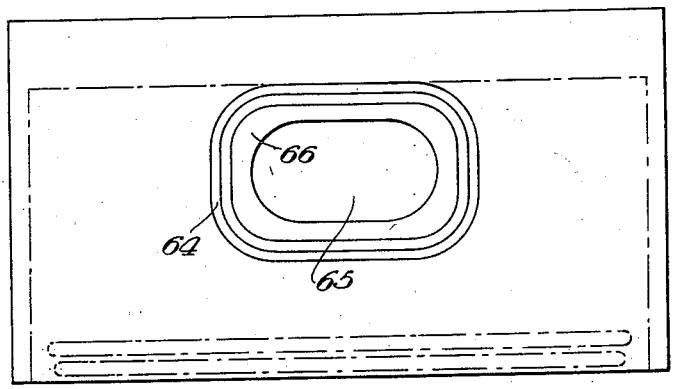
Fig. 3.
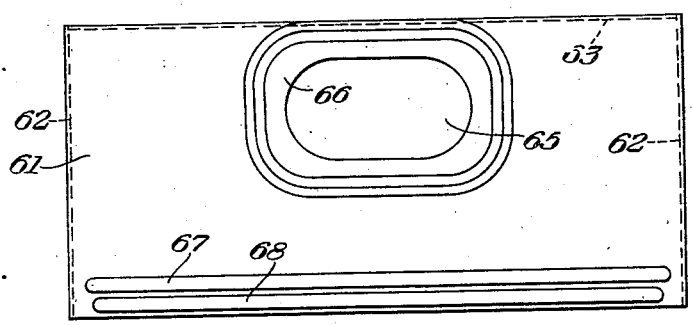
Fig. 4.
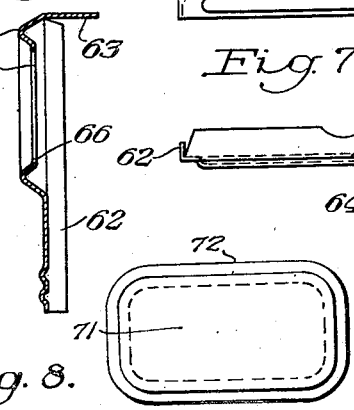
Fig. 6.
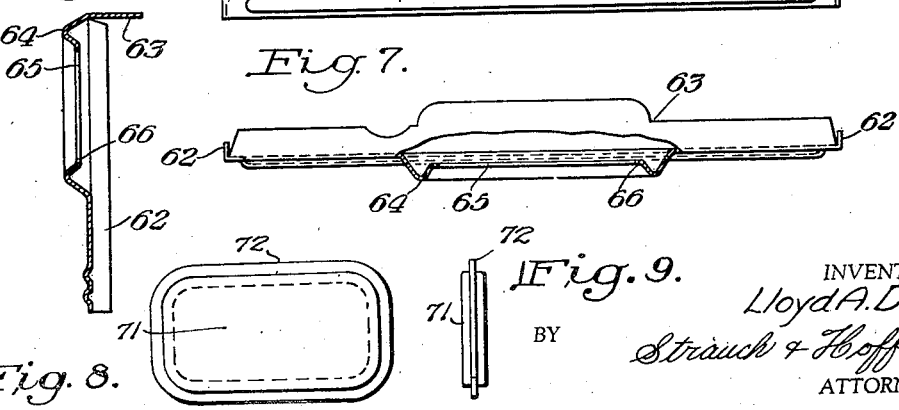
Fig. 7.
Fig. 8.
Fig. 9.
INVENTOR.
Lloyd A. Dixon.
BY Strauch & Hoffman
ATTORNEYS Patented Nov. 10, 1942

2,301,262

UNITED STATES PATENT OFFICE 2,301,262

TIN GAS METER

Lloyd A. Dixon, Du Bois, Pa.

Application February 12, 1938, Serial No. 190,337

1 Claim. (Cl. 73—274)

The present invention relates to improvements in the construction and manufacture of meters, and more particularly to the structures known to the trade as tin gas meters. Meters of this construction usually embody a case made of thin tinned sheet steel elements soldered together and containing two diaphragms or bellows as the measuring elements thereof.

In prior meters of the type illustrated herein, it has been necessary to employ a large number of soldered seams, all of which are potential sources of leakage. It has also been the practice to build the elements of the meter from a number of individual parts. This not only increases the time and cost involved in the manufacture of the meter but also increases the possibility of leakage because of the seams involved. In such types of meters which usually comprise measuring compartments wherein the fluid is actually measured and so-called gallery compartments where the measuring operations are converted into readable indicia, a major problem in the past has been to seal the compartments, one from the other and confine the fluid being measured to the measuring compartments and the passages connected thereto. This has been a major problem in view of the movable mechanical elements such as flag rods which extend from one compartment to the other and has necessitated the use of stuffing boxes, a problem in initial expense and maintenance and a problem in the operation of the meter by reason of the friction and drag imposed upon the moving elements. In prior meters, the transparent apertures or windows in the gallery or registering compartment have been secured by putty or equivalent means which can stand a pressure of only about three pounds per square inch. With such a construction, the sealing of the meter above such a pressure cannot be insured despite the strength of the remaining portions. Furthermore, in repairing such meters, it has always been necessary to remove the glass and replace it after the repairs have been made to prevent loosening of the glass during the handling of the meter.

A further disadvantage of the prior practice of hermetically sealing the gallery from the measuring compartments results from the presence of atmosphere in the gallery compartment which tends to fog the meter glass with changes in temperature and render it difficult to read.

In overcoming the aforesaid disadvantages of the prior art amongst others, it is a major object of this invention to provide a novel meter for measuring fluids wherein the possibility of leakage from any portion is practically eliminated.

More specifically, one of the objects of this invention involves a novel window or register glass construction which is also capable of use in other types of structures other than meters. According to the present invention a register glass is provided for the register case of the meter comprising a molded glass window or window of other suitable transparent material having a strip or mounting of alloy metal extending from the edge of the window and bonded thereto in gas tight relation, whereby the alloy metal strip can be soldered to the tin case of the meter which serves as a support. When glass is used as the transparent material, this strip preferably is composed of an alloy of nickel, cobalt and other metals having the same coefficient of expansion as glass, and is known to the trade as "Kovar." The soldered joint between the alloy strip and metal case of the meter has been found in practice to withstand pressures as high as fifty pounds per square inch without leakage, and the bond between the alloy and glass withstands even higher pressures. This construction permits the presence of gas under considerable pressure in the gallery without danger of leakage and eliminates the necessity for sealing the compartments from the gallery as previously necessary in the prior art meters to prevent the possibility of leakage to the atmosphere. The replacement of air in the gallery by gas eliminates fogging of the meter glass by changes in temperature which causes condensation of the moisture in the air.

If desired, the register glass of the present invention may be secured directly in an opening in the front plate of the gallery. However, I prefer to provide a register box in the gallery front plate by drawing out the metal to provide a raised portion constituting the register box, and the index glass is secured to the edges of the raised portion. This provides a slight offset to allow for the register projecting beyond the wall of the meter case. The gallery front is made by punching a hole in the plate smaller than the final dimensions, firmly clamping the edges of the gallery front plate and extruding the edges of the hole by a die, after which the edges of the plate are bent over and the hole is finished to the proper size. The provision of a register box constructed in this manner eliminates the former practice of having a separate register box and eliminates one solder joint with its possibility of leakage due to imperfect joints, and reduces the cost of manufacture by eliminating the number of operations requiring skilled sheet metal workers. A further advantage of this construction is that the extruded portions of the plate are bent and will yield so as to allow for expansion and contraction of the glass window due to temperature changes and thus not unduly strain the soldered joint holding the glass. The gallery front plate is preferably reinforced by two longitudinal ribs at the bottom, formed by pressing the metal outwardly, to one of which is soldered the front plate of the meter case. These ribs may be formed after the register box is extruded and before the register hole is cut to final dimensions.

In view of the gas tight construction of the register box and gallery, the hemp or other packing formerly used in the stuffing box of the meter is eliminated or is replaced by a grease or other solid lubricant, as there is no longer any necessity to maintain these joints gas tight to the atmosphere. This eliminates friction in the meter and further contributes to accuracy in measurements.

Further objects and advantages of the present invention will appear from the following description and claims.

Figure 1 is a side view of a meter, the outside and parts of the gallery channel casing being shown in section.

Figure 2 is a side view of the gallery front blank.

Figure 3 is a side view of the first drawing operation of the gallery front blank.

Figure 4 is a side view of the final operation on the gallery front blank prior to trimming.

Figure 5 is a side view of the finished gallery front blank with the register glass in position.

Figure 6 is a section taken on the line XII—XII of Figure 5, the glass being removed.

Figure 7 is a plan view of Figure 5, certain parts being broken out to show the register box.

Figure 8 is a front view of the register glass.

Figure 9 is an end view of the register glass.

Referring to the drawings which show a meter embodying the present invention, the case of the meter is perfectly formed of a thin tinned sheet metal bottom wall 5, and a pair of vertical side walls soldered thereto. A back gallery wall 13 is bent over at its ends as at 8 and is soldered to the side walls on the exterior. Wall 13 is beaded adjacent its lower end at 14 and 15, a back chamber plate 16 being soldered to bead 15 and to bottom 5. A dividing wall 19 is soldered to bottom 5 and to a table plate 21 extending across the upper end of the meter, the table plate thus dividing the meter case into bellows compartments 22 and a gallery 23. The bellows compartments contain diaphragms 24 and 25 secured by plates 26 to flag rod carriers 27 which in turn are connected by flag arms 28 to flag rods 29 and 31 leading into the gallery.

The gallery is completed by a top plate 9 which serves as a gallery cover and a front gallery plate 61 to be later described in detail.

Table plate 21 has two holes formed therein surrounded by integral flanges 34 spun or otherwise formed thereon. Reduced ends of bearing members or stuffing boxes 36 are inserted in these holes. The bearing members then are secured in place by solder sweated into the space between the bearing members and flanges. Flanges 34 provide an accurate guide for setting the bearing members perpendicular to table plate 21. Flag rods 29 and 31 extend through the bearing members 36 which are filled with packing or with grease and which are closed by a screw cap 37, through which the flag rods extend into the gallery.

Flag arms 38 and 39 (Figure 1) are each provided with a hole 41 at one end and an integral flange 42 extending therefrom surrounding the hole. The upper end of the flag rods 29 and 31 fit into holes 41 and the flag arms are secured to the flag rods by sweating solder into the space between flanges 42 and the flag rods. The flanges surrounding the holes in the flag arms serve as accuracy gauges to maintain the flag arms perpendicular to the axis of the flag rods. Flag arms 38 and 39 are connected by links such as 43 to a tangent post 45 which is connected to a crankshaft 46 in known manner.

A conduit 47 in the gallery is formed in part by a crankshaft plate or corner piece 48. Crankshaft plate 48 contains a bearing member 49 in which a crankshaft 46 is journalled, the lower end of the crankshaft being supported in a step bearing 51. Crankshaft plate 48 has a hole 52 therein surrounded by an integral flange 53. A reduced end 54 of crankshaft bearing 49 is inserted in this hole and secured in place by sweating solder into the space between the flange and bearing. The flange provides an accurate gauge for maintaining the bearing at right angles to the surface of the crankshaft plate. The bearing 49 may be filled with grease or packing material.

The front of the gallery as shown at 61 preferably comprises a sheet metal plate having its ends flanged over, as indicated at 62 (Figures 1 to 7), and a flange 63 across the top. The gallery front is drawn out or dished out and ribbed as indicated at 64, hole 65 surrounded by a flange 66 being formed in the dished portion. The blank for forming the gallery front is shown in Figure 2, the first operation in forming the plate being the punching of hole 65 in a size smaller than its final desired size. In the next operation the edges of the gallery front are clamped and the metal around the hole is bent and drawn on the double dot and dash line 64' shown in Figure 2 to form rib 64 extending around the hole and is bent back on the double dot and dash line 66' to form flange 66 as shown in Figure 3, the hole being slightly enlarged. These operations form the so-called register box. In the next operation, the edges of the plate are bent over to form end flanges 62 and top flange 63, and at the same time ribs 67 and 68 are dished out near the bottom as indicated by the dot and dash lines. Finally, hole 65 is sheared out to correct size leaving flange 66 surrounding the hole to its proper dimension.

A register 69, which may be driven by any suitable means from crankshaft 46, is positioned adjacent opening 65 in the front gallery plate which is closed by a window 71 of suitable transparent material such as glass (Figures 1, 8 and 9) having a metal strip 72 integrally bonded thereto. When glass is employed as the transparent material, I prefer to make this metal strip of an alloy containing about twenty-nine per cent nickel, seventeen per cent cobalt, and the remainder iron, this alloy being known to the trade as "Kovar." This strip may be embedded in glass window 71 by casting the glass around the strip, the expansion properties of the metal being such that temperature changes will not cause the Kovar strip to come loose. If desired, the strip may be embedded flush with the glass surface. The assembly is then secured in place by soldering Kovar strip 72 to flange 66 surrounding opening 65 in the gallery front. As illustrated in Figure 1, window 71 is thereby mounted within the peripheral confines of rib 64 and inwardly of the rib so as to be protected thereby. The joint thus produced between the Kovar strip and the glass and between the Kovar strip and the flange remains gas tight under any conditions encountered in service. As a result thereof, bearing members of the type shown at 36 can be used in place of the stuffing boxes which heretofore were employed, the bearing members being filled with grease in order to lubricate the bearings. This results in improvement in the operation of the meter as the lubricant filled bearing members offer less frictional resistance to rotation of the flag rods and crankshaft.

If desired, the register glass may be used in conjunction with a separate register case soldered to the gallery front in known manner and is as readily applicable to meters now in use as new meters.

The invention may be embodied in other specific forms without departing from the spirit or essential characteristics thereof. The present embodiment is therefore to be considered in all respects as illustratve and not restrictive, the scope of the invention being indicated by the appended claim rather than by the foregoing description, and all changes which come within the meaning and range of equivalency of the claim are therefore intended to be embraced therein.

What is claimed and desired to be secured by United States Letters Patent is:

A gas meter comprising a gas tight case having a dividing wall therein providing a bellows compartment and a gallery, said meter including a register mechanism disposed in said gallery and actuated from said compartment, a substantially flat metal wall for said gallery provided with a register aperture, an outstanding rib projecting from said wall and surrounding said aperture, a continuous flange comprising an integral continuation of said rib extending about said aperture, and means providing a gas tight window closure at said aperture comprising a window unit consisting of a plate of transparent material provided with a continuous, substantially flat, metal peripheral rim strip having substantially the same coefficient of expansion as said transparent material substantially parallel to said flange and seated on the exterior side of said flange with the transparent plate disposed at said aperture, said strip having one edge permanently imbedded in the periphery of said transparent plate and a substantial portion surrounding said periphery overlying and soldered to said flange, and said window preventing gas which may have escaped from said compartment to the gallery from leaking outwardly of said case.

LLOYD A. DIXON.